United States Patent
Zeller

(10) Patent No.: US 12,079,332 B2
(45) Date of Patent: Sep. 3, 2024

(54) SECURITY DEVICE TO PROTECT ACTIVE COMMUNICATION PORTS

(71) Applicant: Schweitzer Engineering Laboratories, Inc., Pullman, WA (US)

(72) Inventor: Mark L. Zeller, Clarkston, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 341 days.

(21) Appl. No.: 17/502,334

(22) Filed: Oct. 15, 2021

(65) Prior Publication Data

US 2023/0119025 A1  Apr. 20, 2023

(51) Int. Cl.
G06F 21/55 (2013.01)
G06F 11/30 (2006.01)
G06F 21/60 (2013.01)
G06F 21/81 (2013.01)

(52) U.S. Cl.
CPC ........ *G06F 21/554* (2013.01); *G06F 11/3062* (2013.01); *G06F 11/3089* (2013.01); *G06F 21/606* (2013.01); *G06F 21/81* (2013.01)

(58) Field of Classification Search
CPC ............................. G06F 21/552; G06F 21/606
See application file for complete search history.

(56) References Cited

U.S. PATENT DOCUMENTS

| | | | | |
|---|---|---|---|---|
| 7,610,624 B1* | 10/2009 | Brothers | ............... | H04L 63/145 709/224 |
| 8,892,903 B1* | 11/2014 | Trimberger | ........... | G06F 21/755 713/189 |
| 2004/0143747 A1* | 7/2004 | Eckstein | ................. | G06F 21/76 713/189 |
| 2007/0086554 A1* | 4/2007 | Tominaga | ............. | H04L 7/0008 375/372 |
| 2007/0223685 A1* | 9/2007 | Boubion | ................. | G06F 21/32 380/2 |
| 2010/0088440 A1* | 4/2010 | Banks | ................. | G06F 11/2028 710/109 |
| 2011/0260749 A1* | 10/2011 | Deas | ....................... | H04L 9/003 326/8 |
| 2016/0196454 A1* | 7/2016 | Soffer | ................. | H01R 13/665 726/16 |
| 2016/0294098 A1* | 10/2016 | Clark | ....................... | G06F 21/83 |
| 2016/0330192 A1* | 11/2016 | Ishii | ...................... | H04L 63/083 |
| 2022/0075901 A1* | 3/2022 | Fanara | .................. | G06F 21/755 |
| 2022/0174867 A1* | 6/2022 | McCutcheon, IV | ....................... | G05D 1/0278 |

* cited by examiner

*Primary Examiner* — William S Powers
(74) *Attorney, Agent, or Firm* — Jared L. Cherry

(57) ABSTRACT

The present disclosure pertains to systems and methods to monitor communication ports. In one embodiment, a system may include a first interface to connect to a first host device and a second interface to connect to a second host device. The first interface and the second interface may include a plurality of channels to enable communication between the first host device and the second host device. Control logic may monitor a power channel between the first host device and the second host device and a communication channel between the first host device and the second host device. The control logic may detect an interruption of at least one of the power channel or the communication channel. In response to the interruption, the control logic may disable communication between the first host device and the second host device.

21 Claims, 4 Drawing Sheets

SECURITY DEVICE TO PROTECT ACTIVE COMMUNICATION PORTS

TECHNICAL FIELD

The present disclosure pertains to security devices to secure communication ports. More particularly, but not exclusively, the systems and methods disclosed herein may be used in electric power systems to protect against unauthorized access by monitoring communication ports that are unused, along with ports that are in use.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
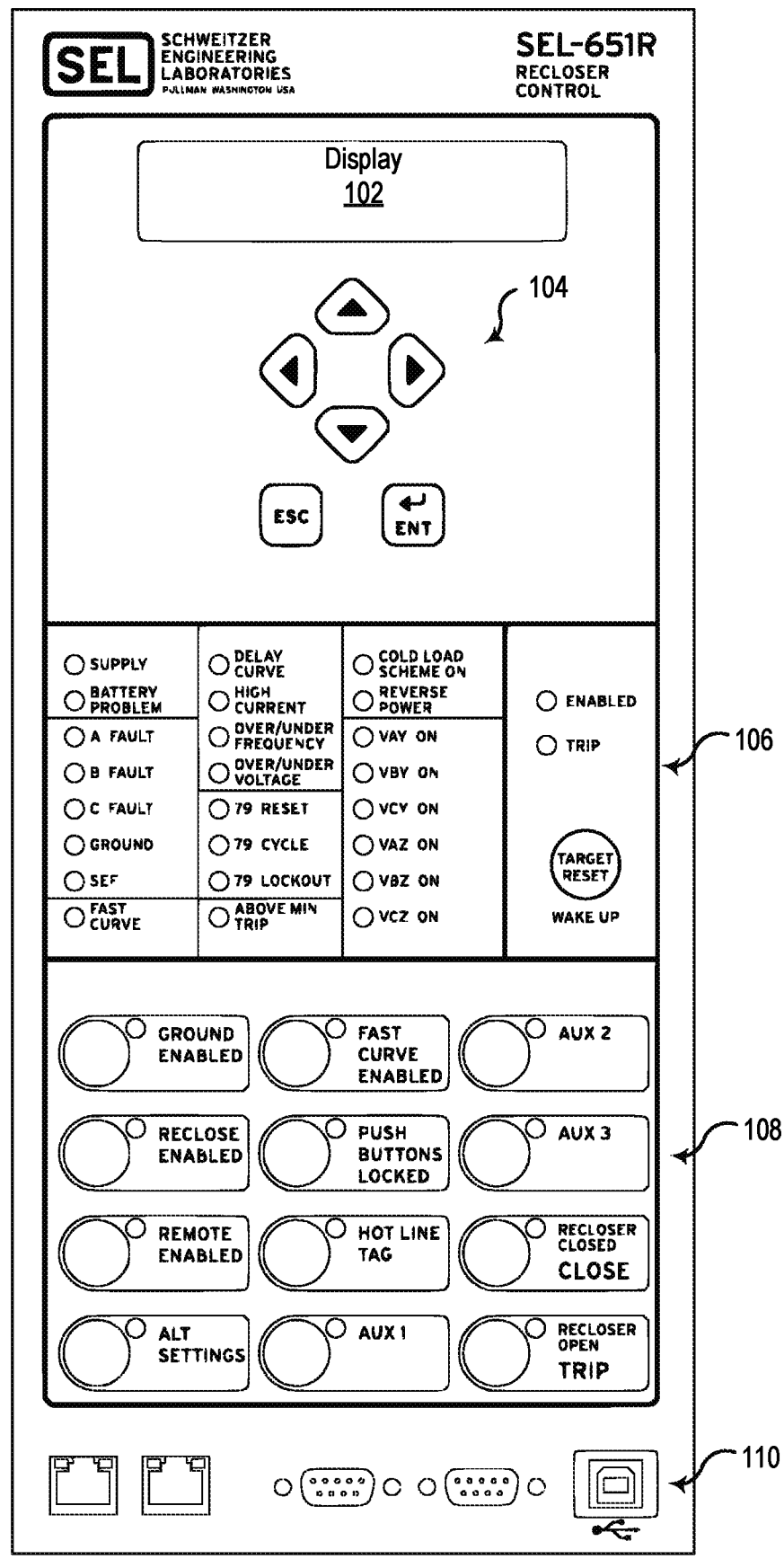
FIG. 1 illustrates an intelligent electronic device (IED) including a plurality of ports into which a security dongle consistent with embodiments of the present disclosure may be plugged.

Communication ports may allow an individual with physical access to a device to interact with the device by connecting to one or more of the unused ports and/or tapping into an active port. Using such a connection, an attacker may gain access to sensitive information and/or damage or disable equipment. Such a threat is particularly acute in the context of critical infrastructure, such as electric power systems.

The potential security concerns related to unused communication ports prompted the North American Electric Reliability Corporation ("NERC") to enter a standard requiring electric system operators to secure unused physical ports. Many schemes to secure unused communication ports rely on physically blocking the ports; however, if the intruder defeats the physical device the port may be left vulnerable. To address this requirement, some operators have filled unused ports with epoxy or other types of material. Such efforts to disable unused communication ports may be irreversible and may have unintended or adverse consequences beyond disabling the unused communication ports.

Similarly, an individual with physical access to a device may connect to active communication ports and disrupt the operation of a system. For example, an attacker may insert a device that allows the attacker to monitor and/or tranmit using an active communication channel. The attacker may gain access to sensitive information by monitoring the channel and/or interfere with the operation of the system.

The inventor of the present disclosure has recognized that various advantages may be realized by connecting a security dongle to unused communication ports. A security dongle consistent with the present disclosure may communicate with another device to ensure that the security dongle remains attached to a communication port. If communication between the device and the security dongle is interrupted, various actions may be implemented, such as triggering an alarm, disabling the port, blocking changes to the IED, or implementing other types of protective actions. Security dongles consistent with the present disclosure may provide a simple and cost-effective way to continuously monitor and secure unused communication ports. Further, security dongles consistent with the present disclosure may allow such ports to remain functional for future use. Security dongles consistent with the present disclosure may also provide dust and dirt protection and provide a visual indication that a port is not in use.

Further, the inventor of the present disclosure has recognized advantages associated with monitoring active communication ports using a security device consistent with the present disclosure. A security device used with an active port may monitor the connection between two devices and trigger an alarm if a disruption is detected (e.g., the cable is unplugged) or if other suspicious activity is detected.

As used herein, an IED may refer to any microprocessor-based device that monitors, controls, automates, and/or protects monitored equipment within a system. Such devices may include, for example, differential relays, distance relays, directional relays, feeder relays, overcurrent relays, voltage regulator controls, voltage relays, breaker failure relays, generator relays, motor relays, remote terminal units, automation controllers, bay controllers, meters, recloser controls, communication processors, computing platforms, programmable logic controllers (PLCs), programmable automation controllers, input and output modules, and the like. The term IED may be used to describe an individual IED or a system comprising multiple IEDs. Further, IEDs may include sensors (e.g., voltage transformers, current transformers, contact sensors, status sensors, light sensors, tension sensors, etc.) that provide information about the electric power system.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. For example, throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Several aspects of the embodiments disclosed herein may be implemented as software modules or components. As used herein, a software module or component may include any type of computer instruction or computer-executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. A module or component may comprise a single instruction or many instructions and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. In some embodiments, the computer or another electronic device may include a processing device such as a microprocessor, microcontroller, logic circuitry, or the like. The processing device may further include one or more special-purpose processing devices such as an application-specific interface circuit (ASIC), PAL, PLA, PLD, field-programmable gate array (FPGA), or any other customizable or programmable device.

FIG. 1 illustrates a representation of a system 100 comprising a plurality of communication ports 110 of various types that may be monitored by security dongles consistent with the present disclosure. The illustrated system comprises a recloser control, model SEL-651R available from Schweitzer Engineering Laboratories of Pullman, Washington; however, the same principles may be applied to a wide range of devices that include communication ports of various types. System 100 includes display 102 to provide information and a plurality of buttons 104 that allow a user to navigate information on the display 102. A plurality of indicators 106 may provide information about various conditions monitored by system 100. A plurality of functions 108 may be used to invoke various functions and settings.

A plurality of communication ports 110 may be used to interface with a variety of devices. In the illustrated embodiment, system 100 includes two serial ports two Ethernet ports, and a USB port. The serial ports may be used for a variety of functions, such as communicating with other devices, retrieving events, adjusting settings, updating firmware, and performing other functions. For example, a communication port may receive a common time signal from a Global Navigational Satellite System (GNSS) (e.g., the Global Positioning System (GPS)) or may communicate with a piece of monitored equipment (e.g., a recloser) in an electric power system.

A security dongle (not shown) may be connected to one or more communication ports 110 of system 100 that are not typically in use. In some embodiments, system 100 may generate and send a stream of communications to the security dongle, and the security dongle may generate responses to such communications. The exchange of communication allows system 100 to confirm that the security dongles remain in place and to confirm that no unauthorized devices are connected to any of the plurality of communication ports 110. Further, system 100 may detect whether a device has been disconnected.

Figure 2:
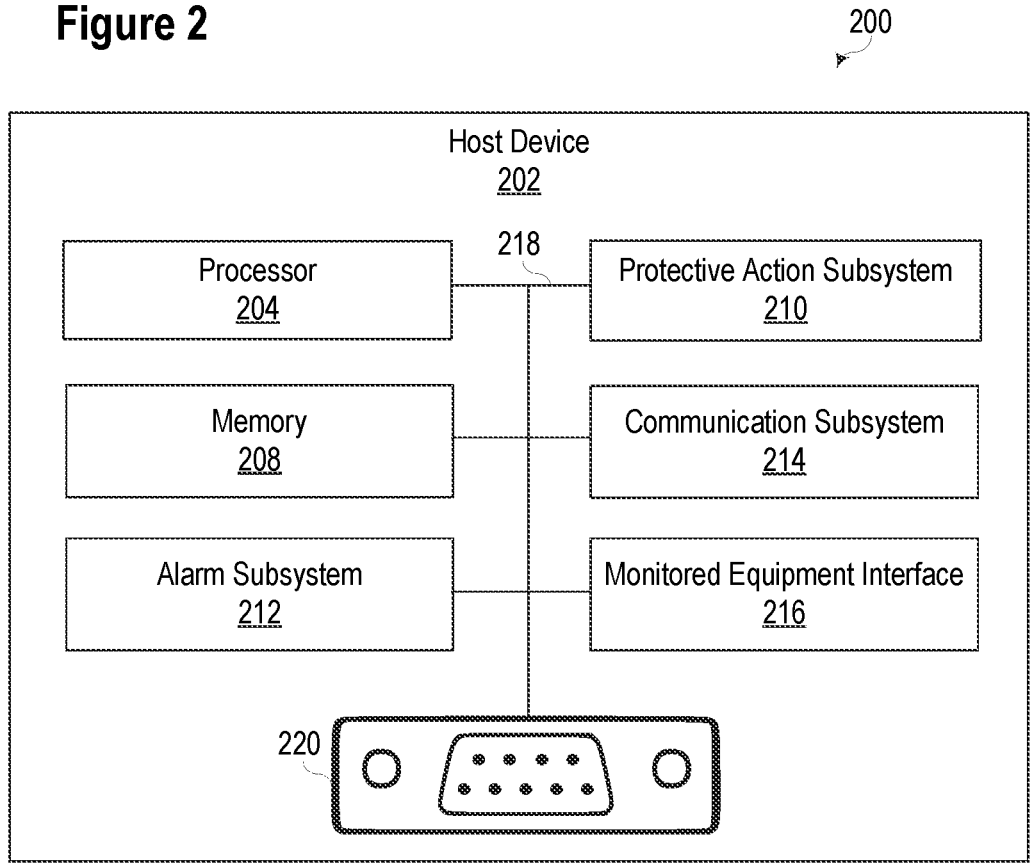
FIG. 2 illustrates a functional block diagram of an IED and a security dongle consistent with embodiments of the present disclosure.

FIG. 2 illustrates a functional block diagram of a system 200 comprising an IED with a communication port 220 and a security dongle 230 consistent with embodiments of the present disclosure. System 200 may be implemented using hardware, software, firmware, and/or any combination thereof. In some embodiments, system 200 comprises an IED, while in other embodiments, certain components or functions described herein may be associated with other devices or performed by other devices. In the illustrated embodiment, security dongle 230 connects to a serial port, but in other embodiments, a security dongle may be configured to connect to a variety of other types of communication ports. The specifically illustrated configuration is merely representative of one embodiment consistent with the present disclosure. A connector 232 disposed on the security dongle 230 may couple the security dongle 230 to the host device 202.

A processor 204 executes instructions stored in a memory 208 and/or received via communication subsystem 214, a monitored equipment interface 216, and the other subsystems and components in host device 202. Processor 204 may operate using any number of processing rates and architectures. Processor 204 may perform various algorithms and calculations described herein. Processor 204 may be embodied as a general-purpose integrated circuit, an application-specific integrated circuit, a field-programmable gate array, and/or any other suitable programmable logic device. Processor 204 may communicate with other elements in system 204 by way of a bus 218. Processor 224 in security dongle 230 may perform a similar function to processor 204.

Memory 208 may be embodied as any of a variety of transitory and non-transitory computer-readable storage media. Memory 208may comprise executable instructions to perform processes or methods described herein. Memory 208 may comprise volatile and non-volatile machine-readable media such as, but not limited to, hard drives, removable media, optical disks, CD-ROMs, DVD-ROMs, ROMs, RAMs, EPROMs, EEPROMs, magnetic or optical cards, solid-state memory devices, or other types of media/machine-readable media suitable for storing electronic instructions or other types of electronic information. Memory 222 in security dongle 230 may perform a similar function to memory 208.

A monitored equipment interface 216 may receive status information from, and issue control instructions to, a piece of monitored equipment (e.g., a generator, transformer, circuit breaker, or the like). Monitored equipment interface 216 may implement control actions upon the detection of various conditions. Such instructions may include, for example, opening a breaker, adjusting a parameter of a generator, changing a tap of a transformer.

A protective action subsystem 210 may implement a protective action based on various conditions monitored by host device 202. For example, a protective action may be implemented by the identification of a fault in an electric power system or by the unauthorized removal of a security dongle 230 from communication port 220. Upon removal of security dongle 230 from communication port 220, protective actions may include blocking communication to or from port 220, disabling port 220, preventing changes to settings associated with host device 202, etc. Further, protective action subsystem 210 may also implement protective action to monitored equipment. Such protective actions include tripping a breaker, selectively isolating a portion of the electric power system, etc.

An alarm subsystem 212 may generate an alarm based upon various conditions. For example, an alarm may be generated based on the interruption of a flow of traffic between host device 202 and security dongle 230. Further, an alarm may be generated based on conditions associated with an electric power system monitored or automated by host device 202. Alarm subsystem 212 may generate and/or transmit an alarm in various ways, including transmission to another device, an email message, an SMS message, or another type of communication to alert an operator of the alarm.

Communication subsystem 214 may be configured to communicate with devices and/or IEDs, including security dongle 230. In certain embodiments, communication subsystem 214 may facilitate direct communication with other IEDs or communicate with systems over a communications network. Communication subsystem 214 may perform negotiations with other devices to establish communication and format messages to comply with various communication protocols. Measurements relating to electrical conditions and other information used by system host device 202 may be transmitted via communication subsystem 214. Further, measurements and information created by host device 202 may be transmitted via communication subsystem 214 to other components, including communication port 220.

Communication subsystem 214 may also generate a flow of traffic sent to and process communications received from security dongle 230. In one embodiment, the flow of traffic may be a simple message that is regularly repeated, and the security dongle 230 may simply retransmit the same message. In other embodiments, more complex exchanges may occur. For example, a message count or coded message may be included in the traffic stream produced by communication subsystem 214, and the responses from security dongle 230 may be verified against an expected result before being accepted. In some embodiments, the stream of data exchanged between host device 202 and security dongle 230 may be encrypted.

A communication subsystem 228 in security dongle 230 may generate a stream of traffic in response to messages received from host device 202. In one embodiment, security dongle 230 simply retransmits the messages received from host device 202 after a delay. In this embodiment, memory 222 may act as a buffer that stores the message for a specified duration. This embodiment may provide a simple implementation because the message from the security dongle 230 is a delayed representation of the message received from the host device 202.

In other embodiments where the exchange is more complex, processor 224 may generate a response based on instructions stored in memory 222. In one embodiment, communication subsystem 228 may include an identifier associated with security dongle 230 that allows host device 202 to identify a particular security dongle. The identifier may allow the host device 202 to determine whether a security dongle has been moved from one communication port to another. Further, the identifier may allow a host device to determine whether a particular security dongle is active when multiple security dongles are in use.

In some embodiments, communication subsystem 228 may further comprise a wireless transmission system that allows security dongle 230 to communicate information wirelessly. Wireless communication may allow security dongle 230 to communicate information to devices other than host device 202. For example, a plurality of security dongles in a substation may each include a Bluetooth or 802.11 interface that transmits information to a security hub. Information from the plurality of devices may allow for a coordinated response across multiple devices.

A power subsystem 226 may provide power to security dongle 230. In various embodiments, power may be drawn from communication port 220. Powering security dongle 230 from communication port 220 avoids the need for an external power supply and may simplify implementation. In one specific embodiment, power subsystem 226 may draw power from communication port 220 based on the disclosure of U.S. Pat. No. 7,034,604, titled Communications Device Powered from Host Apparatus, and which is incorporated herein by reference.

A connector 232 may couple security dongle 230 to communication port 220. Connector 232 comprises a physical interface that physically couples security dongle 230 to communication port 220 and provides electrical connectivity via pins or wires. In the illustrated embodiment, screws 234 and 236 may be used to physically secure security dongle 230 to communication port 220. In some embodiments, the physical connection between communication port 220 and security dongle 230 may include a secured fastener. In one specific embodiment, screws 234 and 236 may include heads with a unique or uncommon pattern to impede the removal of the security dongle 230. In other embodiments, a lock or other type of fastener may impede the removal of the security dongle 230 from communication port 220. Further, the electronics of security dongle 230 may be protected from physical attack in various ways, such as encasing the electronics in an epoxy resin.

Figure 3:
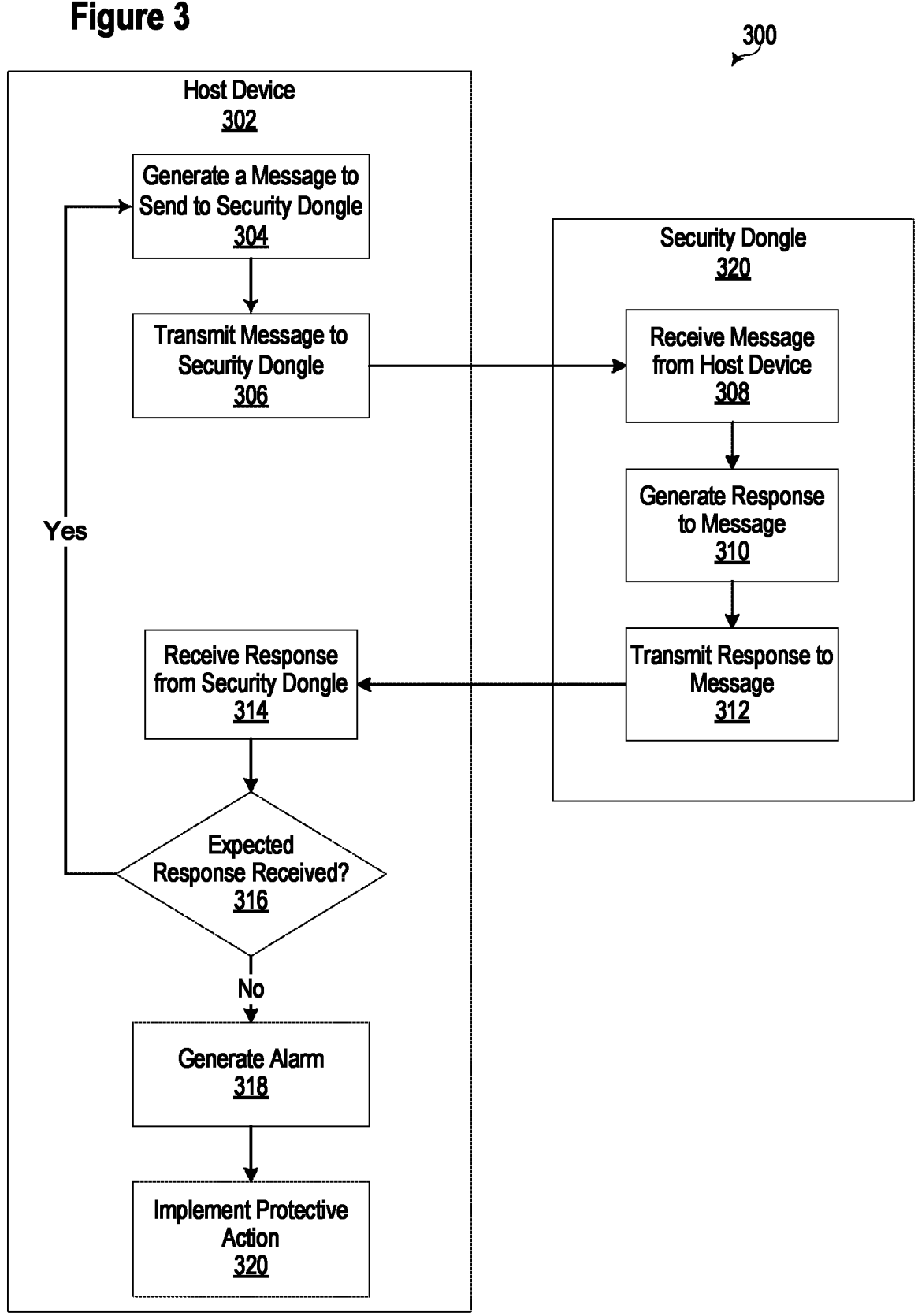
FIG. 3 illustrates a flowchart of a method of monitoring a communication port using a security dongle consistent with embodiments of the present disclosure.

FIG. 3 illustrates a flowchart of a method 300 of monitoring a communication port using a security dongle 320 consistent with embodiments of the present disclosure. At 304, a host device 302 may generate a message to send to the security dongle 320. A variety of types of messages of varying complexity may be generated. For example, the messages may range from a simple message (e.g., a fixed pattern of bits) to a complex message. At 306, the host device 302 may transmit the message to the security dongle 320. The message may be transmitted from host device 302 to the security dongle 320 through a communication port monitored by the security dongle 320. In various embodiments, the communication port may comprise a serial port, an Ethernet port, a USB port, or another type of port.

At 308, the security dongle 320 may receive the message from the host device 302. The security dongle 320 may generate a response to the message at 310. Depending on the embodiment, the response may comprise a simple message or a complex message. In one specific embodiment, the response may be a delayed representation of the received message. Further, in various embodiments, the exchange between the host device 302 and the security dongle 320 may be encrypted. The security dongle 320 transmits the response to the message at 312.

At 314, host device 302 may receive a response from security dongle 320 through the communication interface.

The host device 302 may compare the received response to an expected response at 316. If the received message matches the expected response, the host device may return to 304. If the message does not match the expected response, host device 302 may generate an alarm at 318. The alarm may comprise an email message, an SMS message, or another type of communication to alert an operator of the alarm. The host device 302 may implement a protective action at 320 based on the alarm. In various embodiments, the protective action may comprise disabling the host device 302, disabling the communication port, or taking other actions.

In some embodiments, unused wires in a communication path could be used to monitor an active communication link and/or to ensure a constant communication stream between two devices. A variety of commonly used cables include unused conductors. For example, USB to EIA-232 cables use only four conductors, leaving 5 unused conductors that may be used to provide a communication path between two security dongles. In such embodiments, there may not be a need for an IED or other type of host device to generate traffic. The constant communication between the two security dongles may validate an uninterrupted wired connection between the devices. The ongoing exchange between the two security dongles may make it more difficult for an external device to intercept and decipher the primary communication stream because the external device may not differentiate between the primary communication stream and the traffic between the security dongles. Such embodiments may be used for ports that are either in use or not used, by establishing transmit and receive function inside each security dongle that is independent of the IED. If the security dongle is powered by the IED port, any interruption of the power (e.g., unplugging the security dongle) may generate a protective action (e.g., triggering an alarm, disabling the port, blocking changes to the IED, etc.).

Figure 4:
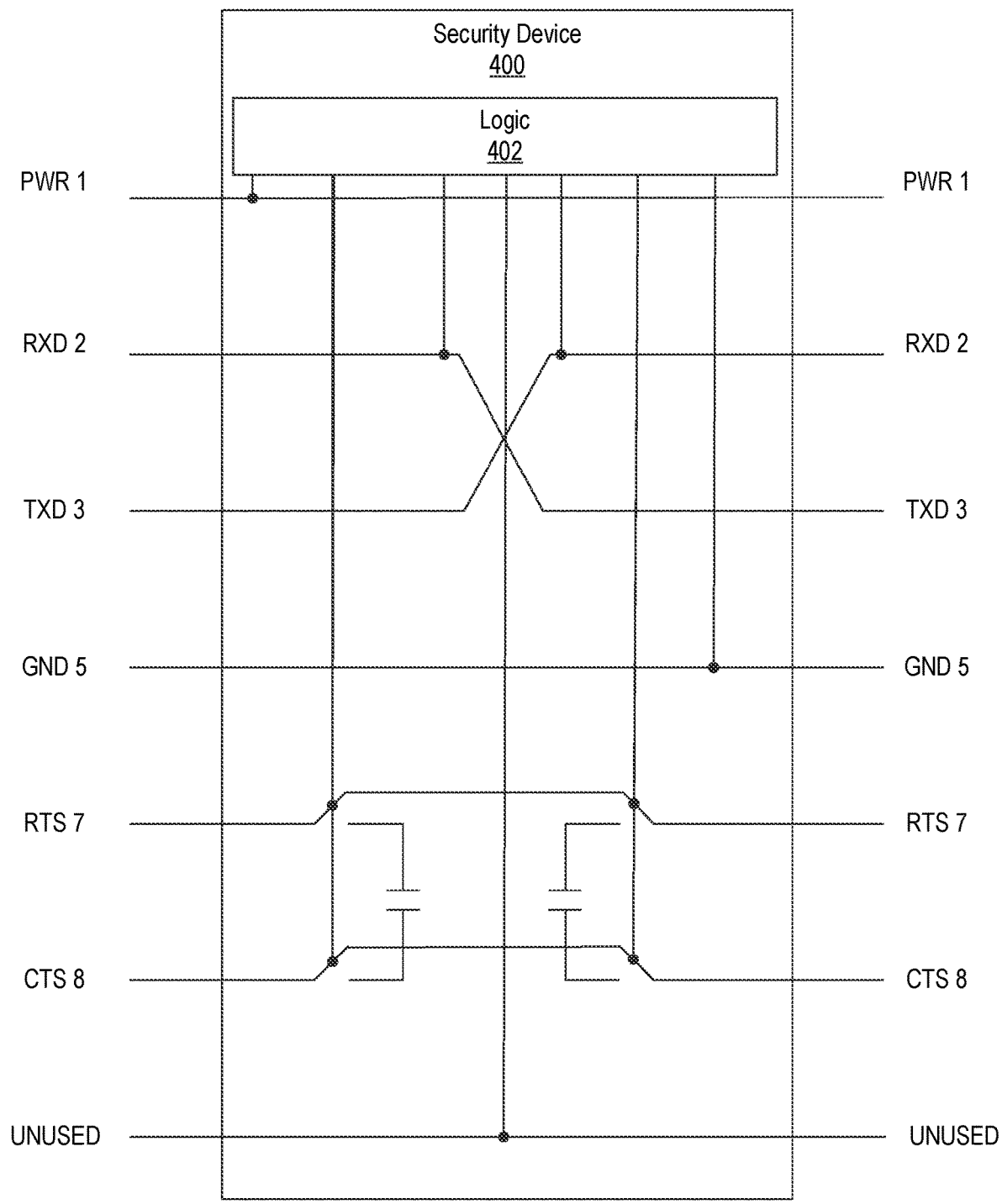
FIG. 4 illustrates a block functional block diagram of a security device operable with an active communication port consistent with embodiments of the present disclosure.

FIG. 4 illustrates a block functional block diagram of a security device 400 operable with an active communication port consistent with embodiments of the present disclosure. Security device 400 is specifically adapted for use with an RS-232 cable, however, similar principles may be used to adapt security device 400 to a variety other types of cables. More specifically, but not exclusively, security devices may be created for USB or Ethernet cables using the principles described herein.

Security device 400 includes a plurality of inputs and outputs. The specific types of inputs and outputs may be determined by the type of cable for which security device 400 is intended for use. In the illustrated embodiment, the inputs and outputs include a power connection (PWR 1), a receive connection (RXD 2), a transmit connection (TXD 3), a ground connection (GND 5), a request to send (RTS 7) connection, a clear to send (CTS 8) connection. In some embodiments one or more unused connections may also be present, but unused connections are not required.

Security device 400 may typically operate transparently to end devices connected to the inputs and outputs. During typical operation, logic 402 may monitor signals on the inputs and outputs to ensure that the communication channel remains uncompromised. A variety of monitoring techniques may be used. For example, the power connection may be monitored. When a cable is disconnected from a communication port, the power connection may be interrupted. This interruption may trigger an alert so that an operator may determine whether the interruption is expected (e.g., associated with maintenance or reconfiguration) or is unauthorized. In some embodiments, security device 400 may also be powered from electrical energy collected from the power connection.

Logic 402 may also monitor the transmit and receive connections for a continuous flow of information. If the flow of information is interrupted, it may be an indication that the communication channel has been compromised, and an alert may be generated. In response to the alert, an operator may determine whether the interruption is expected or is associated with unauthorized activity.

In response to unauthorized activity, security device 400 may block additional communication using the request to send and/or clear to send channels. In response to unauthorized activity or anomalous conditions, logic 402 may connect these channels to capacitors using switches. Such a connection with disable communication using the receive and transmit channels. Security device 400 may be configured to receive a signal to re-enable communication. In one specific embodiment, the signal to re-enable communication may be transmitted using an unused communication channel. In another specific embodiment, security device 400 may be IP addressable and may receive the signal to re-eneable communication through IP communications with If unused channels are available, logic 402 may transmit a periodic signal that is received by devices (e.g., IEDs in an electric power system) connected to the inputs and outputs of security device 400. The connected devices may monitor for an interruption of the periodic signal, and if the periodic signal is interrupted, may suspend communication.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

The invention claimed is:

1. A system, comprising:
a first interface to connect to a first communication port of a first host device;
a second interface to connect to a second communication port of a second host device, wherein the first interface and the second interface comprise a plurality of channels to enable communication between the first host device and the second host device via the first communication port and the second communication port; and
control logic to:
monitor a power channel between the first host device and the second host device;
monitor a communication channel between the first host device and the second host device;
detect an interruption of at least one of the power channel or the communication channel; and
disable communication between the first host device and the second host device in response to the interruption.

2. The system of claim 1, wherein each of the first interface and the second interface comprises an unused channel operable to transmit a flow of traffic generated by the control logic and to cause one of the first host device or the second host device to disable communication between the first host device and the second host device when the flow of traffic deviates from an expectation.

3. The system of claim 2, wherein a signal to re-enable communication following the interruption is transmitted using the unused communication channel.

4. The system of claim 1, wherein the system further comprises a power subsystem to draw power from at least one of the first host device and the second host device and to provide power to the system.

5. The system of claim 1, wherein one of the first host device and the second host device comprises an intelligent electronic device in an electric power system.

6. The system of claim 1, wherein the first interface and the second interface each comprises one of a serial port, an Ethernet port, and a USB port.

7. The system of claim 1, wherein the control logic is further configured to implement a protective action in response to the interruption.

8. The system of claim 1, further comprising a wireless communication subsystem to transmit an alarm to a wirelessly connected device in response to the interruption.

9. The system of claim 1, wherein disabling communication between the first host device and the second host device comprises disconnection of one of the first interface and the second interface.

10. The system of claim 1, wherein the communication channel transmits a continuous flow of information between the first host device and the second host device.

11. A method, comprising:
connecting a first interface to a first communication port of a first host device;
connecting a second interface to a second communication port of a second host device, wherein the first interface and the second interface comprise a plurality of channels to enable communication between the first host device and the second host device via the first communication port and the second communication port;
monitoring, using control logic, a power channel between the first host device and the second host device;
monitoring, using control logic, a communication channel between the first host device and the second host device;
detecting, using control logic, an interruption of at least one of the power channel or the communication channel; and
disabling, using control logic, communication between the first host device and the second host device in response to the interruption.

12. The method of claim 11, further comprising:
generating, using the control logic, a flow of traffic;
transmitting the flow of traffic using an unused channel between the first host device and the second host device; and
disabling communication between the first host device and the second host device when the flow of traffic deviates from an expectation.

13. The method of claim 11, wherein one of the first host device and the second host device comprises an intelligent electronic device in an electric power system.

14. The method of claim 11, further comprising implementing, using the control logic, a protective action in response to the interruption.

15. The method of claim 11, further comprising transmitting, using a wireless communication subsystem, an alarm to a wirelessly connected device in response to the interruption.

16. The method of claim 11, wherein disabling communication between the first host device and the second host device comprises disconnection of one of the first interface and the second interface.

17. A system, comprising:
a first interface to connect to a first host device;
a second interface to connect to a second host device;
a plurality of channels between the first interface and the second interface to enable communication between the first host device and the second host device, the plurality of channels comprising an unused channel between the first host device and the second host device; and
control logic to generate a periodic signal to transmit to at least one of the first host device and the second host device using the unused channel;
wherein at least one of the first host device or the second host device is configured to disable communication on the plurality of channels in response to an interruption in the periodic signal.

18. The system of claim 17, wherein a signal to re-enable communication following the interruption is transmitted using the unused channel.

19. The system of claim 17, wherein the system further comprises a power subsystem to draw power from at least one of the first host device and the second host device and to provide power to the system.

20. The system of claim 17, wherein one of the first host device and the second host device comprises an intelligent electronic device in an electric power system.

21. The system of claim 17, wherein the first interface and the second interface each comprises one of a serial port, an Ethernet port, and a USB port.

* * * * *